United States Patent

[11] 3,627,133

[72] Inventor Stanley F. Rak
 Mundelein, Ill.
[21] Appl. No. 20,000
[22] Filed Mar. 16, 1970
[45] Patented Dec. 14, 1971
[73] Assignee Culligan International Company
 Northbrook, Ill.

[54] CHLORINE GENERATOR FOR WATER SOFTENERS
 10 Claims, 5 Drawing Figs.
[52] U.S. Cl. .................................. 210/98,
 210/140, 210/152, 210/190, 210/251
[51] Int. Cl. ...................................... B01d 35/06,
 B01d 23/26
[50] Field of Search ............................ 210/62, 98,
 190, 191, 192, 251, 152, 243, 140

[56] References Cited
 UNITED STATES PATENTS
 3,078,224 2/1963 Schulze et al. ............... 210/140 X
 3,216,931 11/1965 Dennis et al. ................ 210/190 X Primary Examiner—Frank A. Spear, Jr.
Attorney—Hill, Sherman, Meroni, Gross & Simpson ABSTRACT: A chlorine generator to be inserted in the brine flow line between a water softener unit and a brine tank providing brine regenerant for the softener to sanitize the water softener simultaneously with the regeneration cycle for the exhausted water softener material. The chlorine generator includes a cell inserted in the brine flow line so that the brine flows therethrough when being educted to the water softener, a pair of electrodes formed of inert material in the cell contacting the brine, and a control circuit for supplying current flow to the electrodes and actuated by suitable means upon initiation of the softener regeneration cycle.

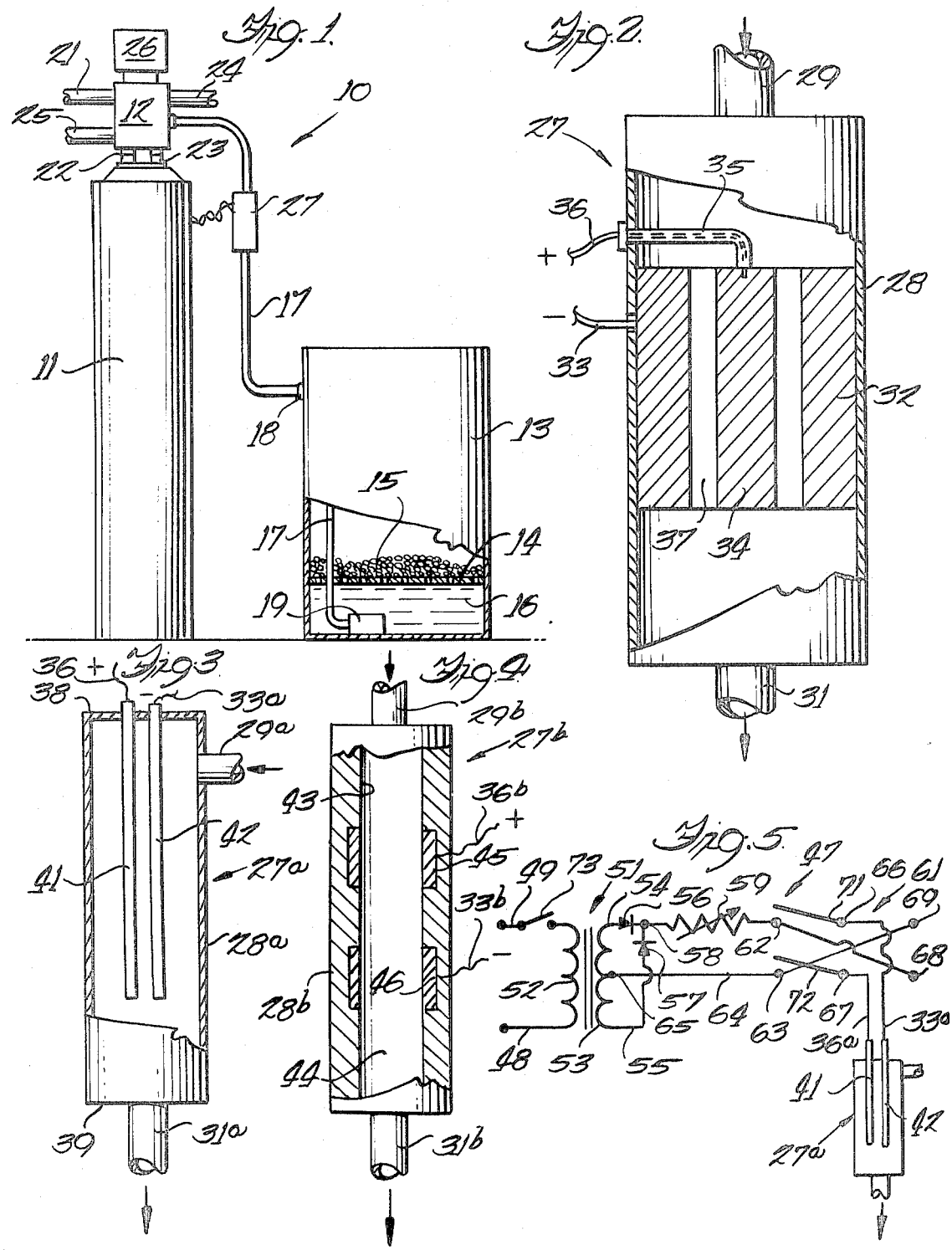

CHLORINE GENERATOR FOR WATER SOFTENERS

The present invention relates to the sanitizing of a water softener and more particularly to a chlorine generator utilized in a water softener system to provide chlorine for the sanitizing of the water softener during regeneration.

Water softeners are used in a variety of installations for a variety of water supplies, such as lake water or well water, which water supplies not only contain hardness, but may also contain organic matter or be subject to contamination. Small water supplies are especially dangerous with regard to possible pollution from seepage or drainage that will render the water unsafe or contain bacteria which is filtered out by the water softening material bed. In view of these dangers, the mineral bed upon regeneration is treated with a small amount of a chlorine-containing compound used to disinfect and sanitize the water softener and the mineral bed.

Where the softener units are provided on an exchange basis and regeneration is accomplished in a service dealer's plant, the addition of a chlorine containing compound during bringing or in the initial rinse water is not a problem; however, for a home-owned water softening unit that is automatically regenerated in the home, sanitization presents more of a problem. The present invention provides a simplified answer to that problem by the use of a small chlorine generator in the unit to provide a small amount of chlorine during regeneration.

Among the objects of the present invention is the provision of a small chlorine generator that makes use of the brine regenerant for the water softener as a source of chlorine to disinfect and sanitize the water softener and mineral bed. The water softener unit includes a brine tank containing brine, formed from salt, for regeneration of the softener and drawn to the softener through a brine flow line operatively connected to an eductor in a control valve for the softener. The chlorine generator includes a cell which is inserted in the brine flow line so that brine passing through the cell provides a source of chlorine upon electrolysis thereof.

Another object of the present invention is the provision of the chlorine generator in the brine flow line from a brine tank to a water softener where the generator includes a cell having a pair of electrodes therein formed of an inert electrical conductor. The chlorine is formed from the brine at the surface of the anode in the cell and the quantity produced is directly proportional to the amount of power applied to the cell. This device has the ability to produce chlorine concentrations from a minute trace to in excess of 1,000 p.p.m.

A further object of the present invention is the provision of a chlorine generator having a control circuit for the cell which may be activated on any desired basis. The circuit can be energized by the signal which causes brine to be educted from the brine tank to the water softener. Chlorination may then be terminated through the actuation of a vacuum switch activated upon the closing of an air eliminator valve in the brine tank; the actuation of a switch based on a time interval during regeneration; or by permitting the gases evolved during the electrochemical process to displace the brine from the cell and terminate the production of chlorine after the air eliminator valve closes.

Further objects are to provide a construction of maximum simplicity, efficiency, economy and ease of assembly and operation, and such further objects, advantages and capabilities as will later more fully appear and are inherently possessed thereby.

In the drawing:

FIG. 1 is a view in front elevation of an automatic water softener or conditioning apparatus partially broken away, embodying the chlorine generator of the present invention between the softener and the brine storage tank.

FIG. 2 is a front elevational view, partially broken away, of one embodiment of chlorine generator.

FIG. 3 is a front elevational view, partially broken away, of a second embodiment of chlorine generator.

FIG. 4 is a front elevational view, partially broken away, of a third embodiment of chlorine generator.

FIG. 5 is a schematic showing of a control circuit for the chlorine generator.

Referring more particularly to the disclosure in the drawing wherein is shown illustrative embodiments of the present invention, FIG. 1 discloses a water softening or conditioning apparatus 10 having a water conditioning tank 11 filled with a suitable ion exchange material, a control valve 12 to cycle the softener through the service, backwash, brine and rinse operations, and a brine tank 13 having a perforated plate 14 supporting a bed 15 of salt, in granule or pellet form, with the formed concentrated brine 16 below the plate. The brine tank is connected to the control valve 12 for the softener through a conduit 17 entering the brine tank adjacent the top at 18 and terminating adjacent the bottom of the brine tank; the conduit terminating either in a screened end member or in an air eliminator valve 19, such as shown in the Mahlstedt et. al. U.S. Pat. No. 3,146,788.

The control valve 12 for the softener tank 11 may be of the type disclosed in the Schulze et. al. U.S. Pat. No. 3,006,376, or the Schulze et. al. U.S. Pat. No. 3,083,728; either valve including a hard water inlet 21, an inlet 22 into the tank 12, an outlet 23 from the tank, a soft water outlet 24, and a drain outlet 25. A suitable timer 26 controls actuation of the solenoid-actuated valve or valves which operate the cycles of service, backwash, brine and rinse. The valve includes an eductor (not shown) through which water flow is diverted during regeneration so as to create a vacuum in the conduit 17 and draw the brine from the tank 13 into the valve 12 where the brine is mixed with hard water and passed through the ion exchange resin to regenerate the exhausted resin.

Inserted in the conduit 17 is a chlorine generator 27 through which all of the concentrated brine passes during regeneration, the brine providing a source for chlorine used to sanitize and disinfect the tank 11 and ion exchange resin during the regeneration operation. The chlorine generator 27 includes a generally cylindrical container or cell 28 closed at each end and having an inlet 29 centrally located in one end and an outlet 31 centrally located in the opposite end. An annular cathode 32 is suitably positioned within the container with a lead wire 33 projecting through the container and connected to the cathode and an anode 34 is centrally positioned within the cathode by a tube 35 secured to the wall of the container 28. A lead wire 36 extends through the wall of the container and the tube 35 to be connected to the anode 34. The anode 34 and the cathode 32 are so positioned as to provide an annular flow passage 37 therebetween for the brine.

During the regeneration operation, all of the brine utilized for regeneration must pass through the chlorine generator 27, and by the imposition of voltage to the generator electrodes 32, 34, an electrolytic reaction of the following nature occurs to provide chlorine gas:

$2NaCl + 2H_2O \rightarrow Cl_2 + 2NaOH + 2H_2$. The amount of chlorine gas produced for a given quantity of brine is dependent on the voltage impressed on the generator cell, with the quantity of chlorine being directly proportional upon the amount of power used. The generator cell is energized by the electrical circuit shown in FIG. 5 which will be later described.

A second embodiment of generator $27^a$ is shown in FIG. 3, and includes a generally cylindrical cell $28^a$ having an inlet $29^a$ in the sidewall of the cell adjacent the end 38 and an outlet $31^a$ centrally positioned in the opposite end 39. A pair of electrodes 41, 42, in the form of rods formed of an inert electrically conductive material extend into the cell $27^a$ through the closed end 38, are generally parallel and are insulated from the cell $28^a$ and from each other. A lead wire $33^a$ is connected to the cathode 42 and a second lead wire $36^a$ is connected to the anode 41. This generator operates in the same manner as the generator 27.

FIG. 4 discloses a third embodiment of chlorine generator $27^b$ having a generally cylindrical cell $28^b$ with an inlet $29^b$ in one end of the cell and an outlet $31^b$ in the opposite end. Embedded in the interior wall 43 of the cell forming the passage 44 for the brine are a pair of axially spaced annular electrodes 45, 46, the anode 45 being connected to the lead wire 36$^b$ and the cathode 46 connected to the lead wire 33$^b$. It is desirable to have the anode upstream of the cathode because the chlorine gas is formed at the surface of the anode 45 and will reduce the pH of the brine. Then as the brine and chlorine sweep across the cathode, it will be neutralized by the cathode reaction products and lessens the tendency for calcium carbonate to scale on the surface of the cathode.

FIG. 5 discloses an electrical circuit 47 which will supply the direct current power for any one of the three embodiments of chlorine generator cells. This circuit is shown connected to the leads 33$^a$ and 36$^a$ of the electrodes 41, 42 of the generator 27$^a$. A pair of leads 48 and 49 from the brining controller, such as the timer 26 (see FIG. 1), extend to the primary winding 52 of an isolation voltage stepdown transformer 51. The secondary winding 53 has a pair of leads 54 and 55, with diodes 56 and 57 in the wires 54 and 55, respectively. The wires intersect at 58 beyond the diodes and extend through a current adjustment potentiometer 59 to one pole 62 of a current reversal switch 61.

The other pole 63 on one side of the switch is connected by a wire 64 to a center tap 65 on the secondary winding 53. The diodes 56 and 57 provide for direct current applied to the electrodes for the electrochemical reaction. The center poles 66, 67 of the current reversal switch are connected to the wires for the electrodes; the wires shown as 33$^a$ and 36$^a$ for the embodiment of the cell shown in FIG. 3. The poles 68 and 69 are connected to the poles 62, 63, respectively, to reverse the direction of current flow upon the switchover of the contact arms 71, 72. A switch 73 may be inserted in the line 49 if control of the production of chlorine is based on other than the total flow of brine through the cell.

In operation, the chlorine generator cell 27 will be energized through the circuit 47 by the same signal in the timer 27 which shifts the control valve 12 to cause brine to be educted from the brine tank 13 through the brine line or conduit 17. One style of softener utilizes an air eliminator valve 19 to close the brine line 17 when the level of brine 16 in the tank 13 falls below a predetermined level, but permits continuation of the eductor flow in order to provide water to rinse the softener 11 free from salt. The cells 27, 27$^a$ and 27$^b$ contemplate this mode of operation and will terminate chlorination once brine flow has ceased by permitting the chlorine and hydrogen gases evolved from the electrochemical process to displace the brine remaining in the cell and, upon displacement of the brine from the cell, the circuit is interrupted and the production of chlorine is terminated. For this reason, it is necessary that the cells be properly oriented to the brine flow in the conduit 17.

A more positive method of termination of the production of chlorine from a cell would be by the incorporation of a vacuum switch 73 in the line 49, which switch would interrupt the current flow in the circuit to the cell. The vacuum switch 73 is actuated upon the closing of the air eliminator valve 19 in the brine tank 13 when the brine eduction has been completed. A third method of controlling the cell would be by the introduction of a switch (not shown) into the timer mechanism 26 which would interrupt the current flow to circuit 47 at a present time interval after actuation of the cell. Such a switch or contact would be activated by means of a cam in the timer that sequences the softener through the cycle of operation.

As seen in the circuit 47, a current reversal switch 61 is utilized in the circuit so as to reverse the polarity of the electrodes periodically in order to dissolve scale deposits which may form on the cathode if the salt used for the preparation of the brine is of a poor quality. The electrodes utilized in the generator cells are preferably formed of graphite; however, any inert electrical conductor would be satisfactory for these electrodes.

Having thus disclosed my invention, I claim:

1. In a water softener system having a water softener tank, control valve and timer assembly, and a separate brine tank connected to the control valve through a brine conduit, a chlorine generator in the brine conduit to produce chlorine from the brine as it passes to the control valve to sanitize and disinfect the water softening material, the chlorine generator including a cell having an inlet and an outlet for the brine passing therethrough, a pair of electrodes in said cell exposed to the brine passing therethrough, and means supplying current flow to said electrodes to produce an electrochemical reaction for the production of chlorine gas from a portion of the brine.

2. A water softener system as set forth in claim 1, in which said cell has a hollow cylindrical body with closed ends, said inlet being positioned in one closed end and said outlet being positioned in the opposite closed end, said electrodes including an annular cathode positioned in said cell and a generally cylindrical anode centrally located within said cathode so as to provide an annular passage therebetween for flow of brine.

3. A water softener system as set forth in claim 1, in which said cell includes a hollow cylindrical body with closed ends, said inlet entering the cylindrical body adjacent one end and said outlet being positioned in the opposite closed end, said electrodes including an anode and a spaced cathode projecting through the closed end adjacent said inlet in parallel fashion to extend into said cell.

4. A water softener system as set forth in claim 1, in which said cell includes a hollow cylindrical body having closed ends and a central passage therethrough, said inlet being positioned in one closed end and said outlet being positioned in the opposite end, said electrodes including a pair of axially spaced annular rings positioned in the wall of the central passage with an inner surface exposed to the brine flow through the passage.

5. A water softener system as set forth in claim 4, in which said annular electrodes comprise an anode upstream of a cathode.

6. A water softener system as set forth in claim 1, in which said current flow supply means comprises an electrical conduit connected to the power source for said timer, a stepdown transformer having a primary coil connected to the power source and a secondary coil, a pair of leads from the ends of said secondary coil, each lead having a diode therein, intersecting and connected to one electrode, and a center tap on the secondary coil connected with the other electrode.

7. A water softener system as set forth in claim 6, including a current adjustment potentiometer in the line from the ends of said secondary coil.

8. A water softener system as set forth in claim 6, including a current reversal switch positioned between the leads from the secondary coil and said electrodes.

9. A water softener system as set forth in claim 6, in which current flow is terminated when the flow of brine ceases, the brine remaining in the cell being displaced by the gases produced by the electrochemical reaction.

10. A water softener system as set forth in claim 6, including a vacuum switch in a line leading to said primary coil actuated when the flow of brine from the brine tank is terminated.

* * * * *